(12) United States Patent
Zhang

(10) Patent No.: US 12,525,143 B2
(45) Date of Patent: Jan. 13, 2026

(54) MULTIFUNCTIONAL TEACHING DEMONSTRATION DEVICE FOR ECONOMIC MANAGEMENT

(71) Applicant: Shandong University of Science and Technology, Qingdao (CN)

(72) Inventor: Wei Zhang, Qingdao (CN)

(73) Assignee: Shandong University of Science and Technology, Qingdao (CN)

( * ) Notice: Subject to any disclaimer, the term of this patent is extended or adjusted under 35 U.S.C. 154(b) by 410 days.

(21) Appl. No.: 18/219,118

(22) Filed: Jul. 7, 2023

(65) Prior Publication Data
US 2025/0014479 A1    Jan. 9, 2025

(51) Int. Cl.
*G09B 19/18*    (2006.01)
(52) U.S. Cl.
CPC ................... *G09B 19/18* (2013.01)
(58) Field of Classification Search
CPC ....................................... G09B 19/18
See application file for complete search history.

(56) References Cited

FOREIGN PATENT DOCUMENTS

| CN | 107232756 A | * | 10/2017 | ............ A47B 13/00 |
| CN | 111968489 A | * | 11/2020 | ............ G09B 19/00 |
| CN | 112270874 A | * | 1/2021 | ................ B43L 1/00 |
| CN | 113053212 A | * | 6/2021 | ............ G09B 19/18 |

* cited by examiner

*Primary Examiner* — Kesha Frisby
(74) *Attorney, Agent, or Firm* — Bayramoglu Law Offices LLC

(57) ABSTRACT

A multifunctional teaching demonstration device for economic management is provided. It includes a folding device the back of the folding device is provided with multiple folding components, the front of the folding device is provided with a display, the front of the display is flexibly connected to a transparent board, the left side of the display is flexibly connected to the first demonstration module, the right side of the display is flexibly connected to the second demonstration module, there are two first teaching aid cabinets under the first demonstration module and the second demonstration module, the bottom of the first teaching aid cabinets is flexibly connected to the second teaching aid cabinet.

5 Claims, 3 Drawing Sheets

MULTIFUNCTIONAL TEACHING DEMONSTRATION DEVICE FOR ECONOMIC MANAGEMENT

TECHNICAL FIELD

The invention relates to the technical field of teaching tools, especially to a multifunctional teaching demonstration device for economic management.

BACKGROUND

Economic management includes economics and management, economics includes macroeconomics and microeconomics, and management focuses on the structural coordination between materials and focuses on people's subjective activities. In the teaching of economic management, it is often necessary to use teaching equipment for demonstration. In the demonstration of economic management teaching, projection playback or display playback is used mostly for the explanation, and there are often charts in the teaching process of economic management, the teaching form of single courseware is easy to feel boring, and teachers are not easy to operate the courseware twice, which affects the teaching effect. Therefore, a multifunctional teaching demonstration device is needed to make the teaching methods more diversified and increase students' enthusiasm for the class.

SUMMARY

The purpose of the invention is to provide a multifunctional teaching demonstration device for economic management, which solves the problem that the courseware is not easy to operate twice and the teaching demonstration effect is not good in the economic management teaching class. It is convenient for teaching, improves the interest of the classroom and the enthusiasm of students, makes the teaching methods more diversified, and the device also has the characteristics of easy operation and easy storage.

In order to achieve the above purpose, the invention adopts the following technical solution:

A multifunctional teaching demonstration device for economic management, including a folding device, the back of the folding device is provided with multiple folding components, the front of the folding device is provided with a display, the front of the display is flexibly connected to a transparent board, the left side of the display is flexibly connected to the first demonstration module, the right side of the display is flexibly connected to the second demonstration module, there are two first teaching aid cabinets under the first demonstration module and the second demonstration module, the bottom of the first teaching aid cabinets is flexibly connected to the second teaching aid cabinet, the bottom of the folding device is provided with a telescopic rod, the bottom of the telescopic rod is provided with a base, the lower surface of the base is provided with multiple pillars, and the pillars are connected with pulleys.

Preferably, the edge of the transparent board is set with multiple of the first scale lines, and the top of the transparent board is set with the first handle.

Preferably, the first demonstration module includes a histogram board, the edge of the histogram board is set with multiple of the second scale lines, the histogram board is set with multiple telescopic columns, and the top of the histogram board is set with the second handle.

Preferably, the second demonstration module includes a line chart board. The edge of the line chart board is set with multiple of the third scale lines, there are multiple sliders on the line chart board, connection points are flexibly connected on the sliders, connecting lines are set among the connection points, and the top of the line chart board is set with a third handle.

Preferably, the second teaching aid cabinet is set up as a drawer-type structure, and the second teaching aid cabinet is provided with a trough.

Therefore, the invention adopts the above structure of a multifunctional teaching demonstration device for economic management with the following advantages:

1. The transparent board set on the display can be edited twice based on the original courseware, which is convenient for teaching; at the same time, the transparent board can slide up and down on the display, or it can be separated from the display, which is convenient for displaying and circulating the content of the blackboard to the students, so as to avoid the situation that the students miss the knowledge points.

2. Statistical charts are often used in economic management, this device can not only enrich the teaching method, but also attract the interest of the class and approve the interaction with the students, mobilizing the enthusiasm of the class, and improving the effectiveness of the teaching demonstration by setting the histogram board and the line chart board.

3. By setting up the teaching aid cabinets, some commonly used teaching aids can be stored, so that the device also has the function of storage, which further facilitates the teaching of teachers; the setting of the telescopic rod and the pulleys is convenient for the teacher to move the device; the whole device is set up as a folding structure, which can not only saves the space when using and is convenient for storage, but also protects the display and avoids damage.

The following is a further detailed description of the technical solution of the invention through drawings and an embodiment.

Marks in the figures: 1, folding device; 11, folding component; 2, display; 3. transparent board; 31, the first scale line; 32, the first handle; 4, the first demonstration module; 41, histogram board; 42, the second scale line; 43, telescopic column; 44, the second handle; 5, the second demonstration module; 51, line chart board; 52, the third scale line; 53, slider; 54, connection point; 55, connecting line; 56, the third handle; 6, the first teaching aid cabinet; 7, the second teaching aid cabinet; 71, trough; 8, telescopic rod; 9, base; 10, pillar; 11, pulley.

DETAILED DESCRIPTION OF THE EMBODIMENTS

The following is a further explanation of the technical solution of the invention through drawings and an embodiment.

Unless otherwise defined, the technical terms or scientific terms used in the invention should be understood by people with general skills in the field to which the invention belongs. The words 'first', 'second' and the like used in this invention do not represent any order, quantity, or importance, but are only used to distinguish different components. Similar words such as 'include' or 'comprise' mean that the elements or objects appearing before the word cover the elements or objects listed after the word and their equivalents, without excluding other elements or objects. The terms 'setup', 'installation', and 'connection' should be understood in a broad sense. For example, it can be a fixed connection, detachable connection, or integrated connection. It can be a mechanical connection or electrical connection; it can be directly connected or indirectly connected through an intermediate medium, which can be the internal connection of two components. 'Up', 'down', 'left', 'right', etc. are only used to represent relative positional relationships, when the absolute position of the described object changes, the relative positional relationship may also change accordingly.

Embodiment

Figure 1:
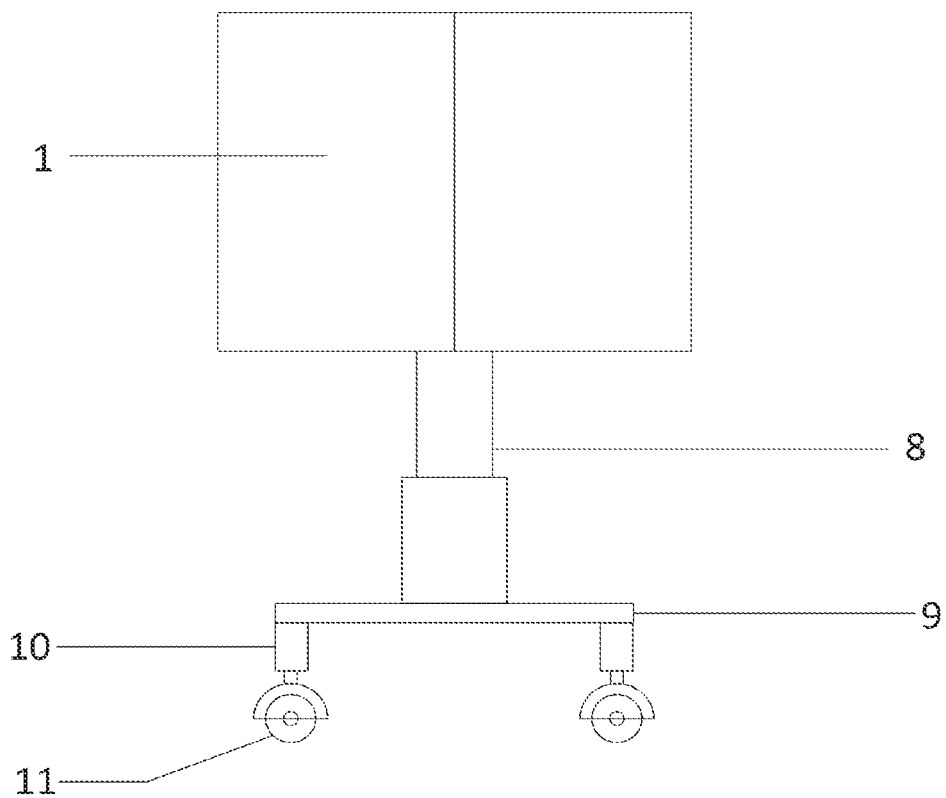
FIG. 1 is a structural schematic diagram of the embodiment of the multifunctional teaching demonstration device for economic management.
Figure 2:
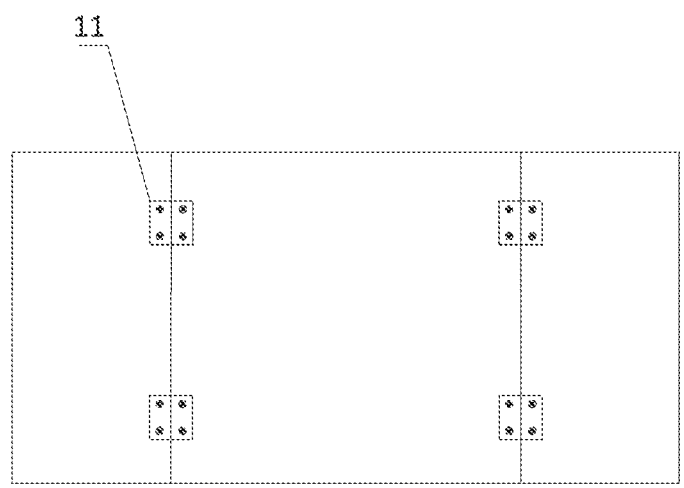
FIG. 2 is a back view of the folding device of the embodiment of the multifunctional teaching demonstration device for economic management.
Figure 3:
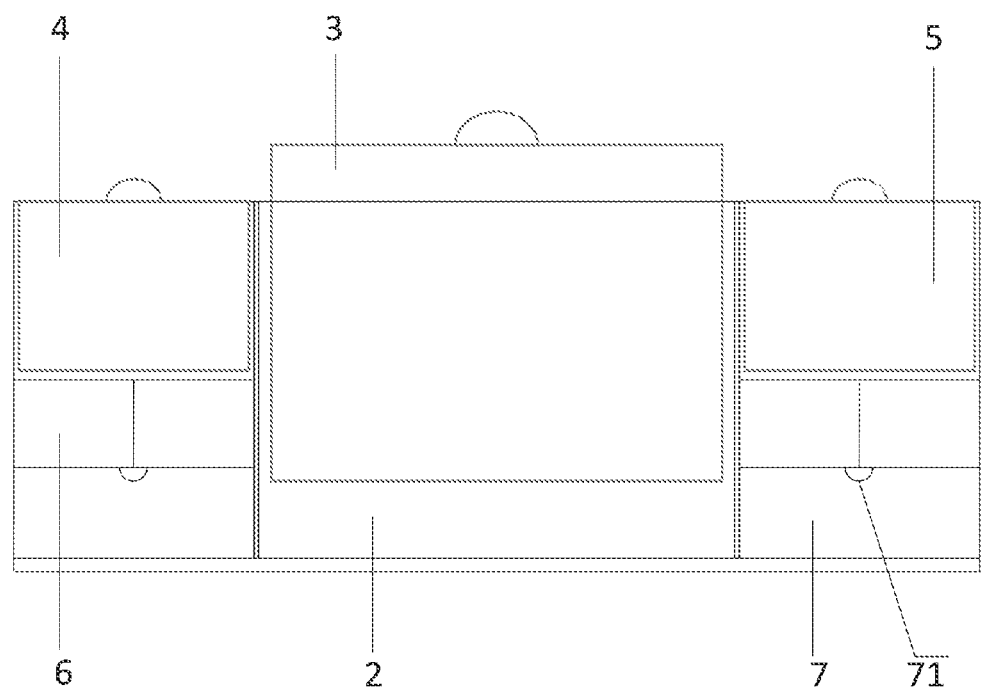
FIG. 3 is an unfolding diagram of the folding device of the embodiment of the multifunctional teaching demonstration device for economic management.
Figure 4:
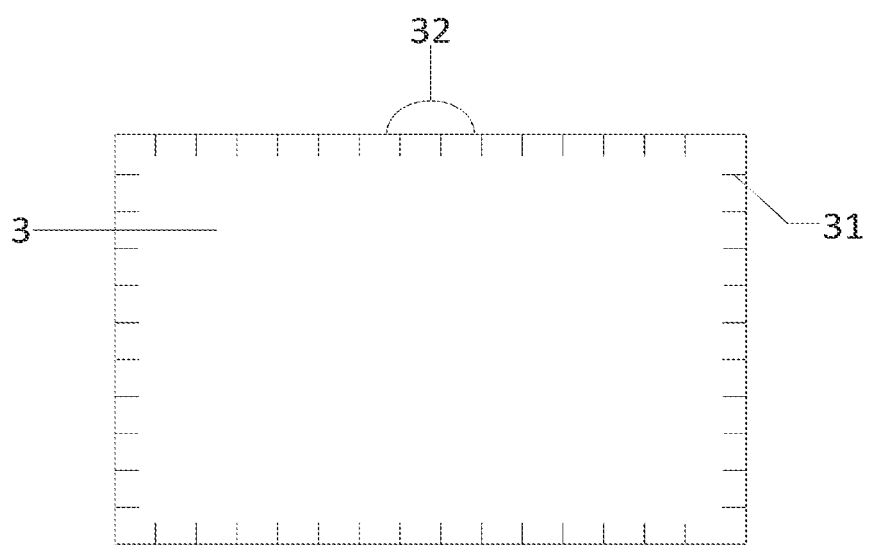
FIG. 4 is a structure diagram of the transparent board of the embodiment of the multifunctional teaching demonstration device for economic management.
Figure 5:
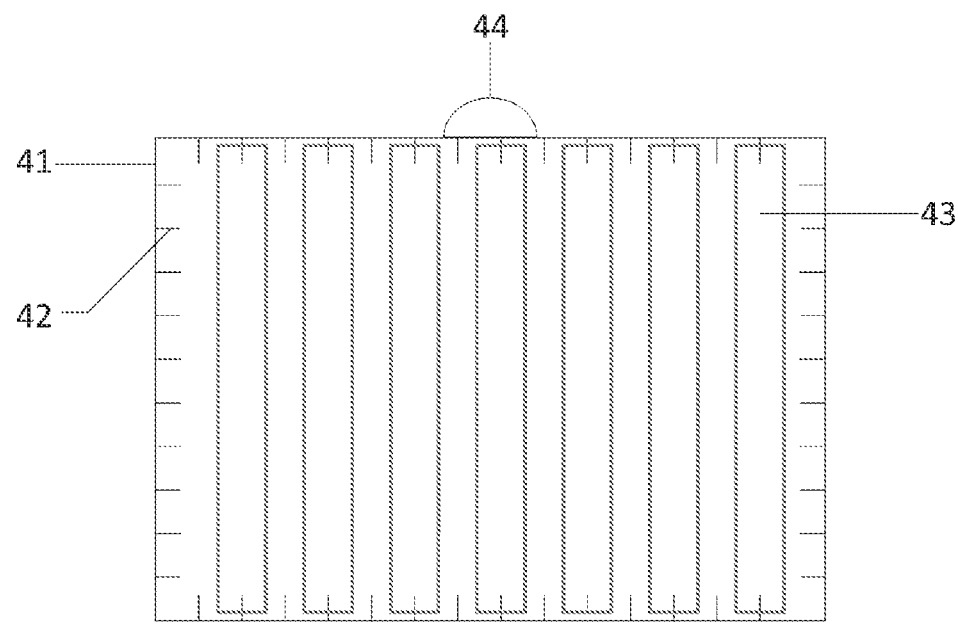
FIG. 5 is a structure diagram of the first demonstration module of the embodiment of the multifunctional teaching demonstration device for economic management.
Figure 6:
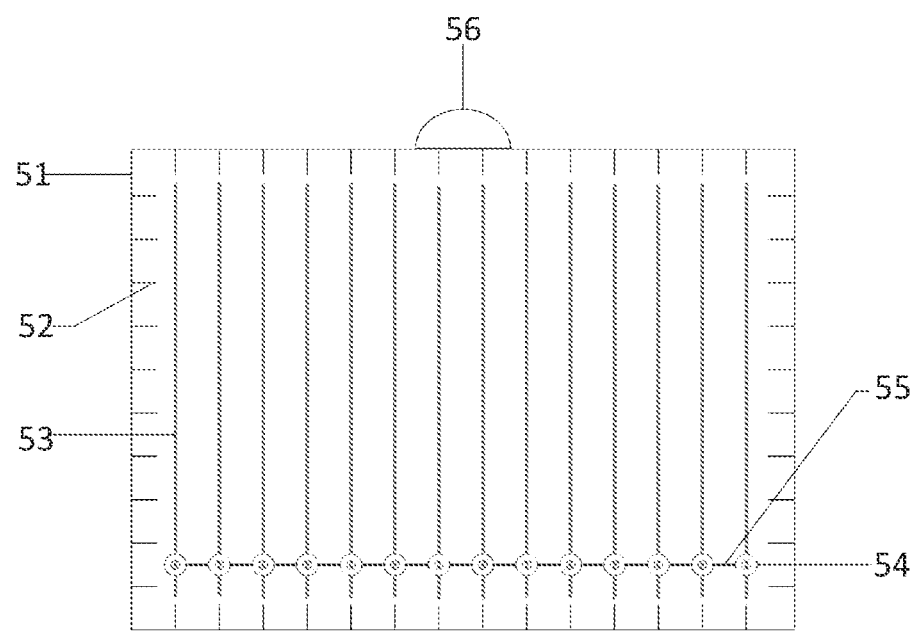
FIG. 6 is a structure diagram of the second demonstration module of the embodiment of the multifunctional teaching demonstration device for economic management.

As shown in FIGS. 1-6, the invention provides a multifunctional teaching demonstration device for economic management, including folding device 1, the front of folding device 1 is provided with display 2, and the front of display 2 is connected to transparent board 3, transparent board 3 can be edited twice based on the original courseware, which is convenient for teaching; the edge of transparent board 3 is set with multiple of the first scale lines 31, and the top of transparent board 3 is set with the first handle 32; transparent board 3 can be lifted up and down through the first handle 32, and transparent board 3 can also be separated from display 2 so that the blackboard content can be displayed and circulated to the students to avoid missing knowledge points.

As shown in FIGS. 1-6, the invention provides a multifunctional teaching demonstration device for economic management, the left side of display 2 is flexibly connected to the first demonstration module 4, and the right side of display 2 is flexibly connected with the second demonstration module 5; the first demonstration module 4 includes histogram board 41, the edge of histogram board 41 is set with multiple of the second scale lines 42, histogram board 41 is set with multiple telescopic columns 43, and the top of histogram board 41 is set with the second handle 44; the second demonstration module 5 includes line chart board 51, the edge of line chart board 51 is set with multiple of the third scale lines 52, line chart board 51 is set with multiple sliders 53, connection points 54 are flexibly connected on the sliders 53, connecting lines 55 are set among the connection points 54, and the top of line chart board 51 is set with the third handle 56, both teachers and students can operate histogram board 41 and line chart board 51, which not only increases the teaching method, but also improves the interest of the class and the interaction with the students, mobilizes the enthusiasm of the class, and improves the effect of the teaching demonstration.

As shown in FIGS. 1-6, the invention provides a multifunctional teaching demonstration device for economic management, the first demonstration module 4 and the second demonstration module 5 are provided with two first teaching aid cabinets 6 below the first demonstration module 4 and the second demonstration module 5, the bottom of the first teaching aid cabinets 6 is flexibly connected to the second teaching aid cabinet 7, the second teaching aid cabinet 7 is set up as a drawer-type structure, and the second teaching aid cabinet 7 is provided with trough 71; some commonly used teaching aids can be stored in the teaching aid cabinets so that the device also has the function of storage, which further facilitates teaching.

As shown in FIGS. 1-6, the invention provides a multifunctional teaching demonstration device for economic management, the back of folding device 1 is provided with multiple folding components 11 so that the whole device is a folding structure, the first demonstration module 4 and the second demonstration module 5 are rotated and folded to the front of display 2 through folding components 11 to complete the storage of folding device 1, the bottom of folding device 1 is provided with telescopic rod 8, the bottom end of telescopic rod 8 is provided with base 9, the lower surface of base 9 is provided with multiple pillars 10, pillars 10 are connected with pulleys 11, and pulleys 11 are provided with lock pulleys, which is convenient for the teacher to move the device; it saves space and increases the practicability of the device.

Therefore, the invention adopts a multifunctional teaching demonstration device for economic management with the above structure, which can solve the problem that the courseware is not easy to operate twice and the teaching demonstration effect is not good in the economic management teaching class. It is convenient for teaching, improves the interest of the classroom and the enthusiasm of students, makes the teaching methods more diversified, and the device also has the characteristics of easy operation and easy storage.

Finally, it should be explained that the above embodiment is only used to explain the technical solution of the invention rather than restrict it. Although the invention is described in detail concerning a better embodiment, the ordinary technical personnel in this field should understand that they can still modify or replace the technical solution of the invention, and these modifications or equivalent substitutions cannot make the modified technical solution out of the spirit and scope of the technical solution of the invention.

What is claimed is:

1. A multifunctional teaching demonstration device for economic management, comprising a folding device, a back of the folding device is provided with a plurality of folding components, a front of the folding device is provided with a display, a front of the display is flexibly connected to a transparent board, a left side of the display is flexibly connected to a first demonstration module, a right side of the display is flexibly connected to a second demonstration module, two first teaching aid cabinets are provided under the first demonstration module and the second demonstration module, a bottom of each of the two first teaching aid cabinets is flexibly connected to the second teaching aid cabinet, a bottom of the folding device is provided with a telescopic rod, a bottom of the telescopic rod is provided with a base, a lower surface of the base is provided with a plurality of pillars, and the plurality of pillars are connected with pulleys.

2. The multifunctional teaching demonstration device according to claim 1, wherein an edge of the transparent board is set with a plurality of first scale lines, and a top of the transparent board is set with a first handle.

3. The multifunctional teaching demonstration device according to claim 2, wherein the first demonstration module comprises a histogram board, an edge of the histogram board is set with a plurality of second scale lines, the histogram board is set with a plurality of telescopic columns, and a top of the histogram board is set with a second handle.

4. The multifunctional teaching demonstration device according to claim 3, wherein the second demonstration module comprises a line chart board; an edge of the line chart board is set with a plurality of third scale lines, a plurality of sliders are provided on the line chart board, connection points are flexibly connected on the plurality of sliders, connecting lines are set among the connection points, and a top of the line chart board is set with a third handle.

5. The multifunctional teaching demonstration device according to claim 4, wherein the second teaching aid cabinet is set up as a drawer-type structure, and the second teaching aid cabinet is provided with a trough.

* * * * *